US010737717B2

(12) United States Patent
Peng et al.

(10) Patent No.: US 10,737,717 B2
(45) Date of Patent: Aug. 11, 2020

(54) TRAJECTORY TRACKING FOR VEHICLE LATERAL CONTROL USING NEURAL NETWORK

(71) Applicant: GM GLOBAL TECHNOLOGY OPERATIONS LLC, Detroit, MI (US)

(72) Inventors: Farui Peng, Sterling Heights, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 15/896,352

(22) Filed: Feb. 14, 2018

(65) Prior Publication Data

US 2019/0248411 A1 Aug. 15, 2019

(51) Int. Cl.
*B62D 6/00* (2006.01)
*G01S 19/45* (2010.01)
*G06N 3/04* (2006.01)
*G06N 3/08* (2006.01)

(52) U.S. Cl.
CPC .............. *B62D 6/002* (2013.01); *G01S 19/45* (2013.01); *G06N 3/04* (2013.01); *G06N 3/084* (2013.01)

(58) Field of Classification Search
CPC .... G05B 13/0205; G05B 13/27; G05B 13/00; G05B 13/02; G05B 13/0265; G05B 13/027; G05B 13/0285; G05B 13/029; G06N 3/08; G06N 3/084; B62D 6/002; B62D 6/003; B62D 6/02

See application file for complete search history.

(56) References Cited

U.S. PATENT DOCUMENTS

| | | | | |
|---|---|---|---|---|
| 5,796,922 A | * | 8/1998 | Smith | G05B 13/0265 706/23 |
| 6,155,927 A | * | 12/2000 | Levasseur | A63F 13/10 463/42 |
| 6,385,515 B1 | * | 5/2002 | Dickson | A01B 69/001 348/120 |
| 10,379,538 B1 | * | 8/2019 | Sheckells | B60W 30/10 |

(Continued)

OTHER PUBLICATIONS

Sabin, "Now Anybody Can Use 'GTA V' to Develop a Self-Driving Car," Jan. 11, 2017, https://www.inverse.com/article/26307-grand-theft-auto-open-ai (Year: 2017).*

(Continued)

*Primary Examiner* — Thomas G Black
*Assistant Examiner* — Sara J Lewandroski
(74) *Attorney, Agent, or Firm* — Lorenz & Kopf, LLP (57) ABSTRACT

A processor-implemented method in a vehicle for performing automatic vehicle lateral control using a neural network for trajectory tracking is provided. The method includes receiving a desired vehicle trajectory; constructing, from the desired trajectory, desired waypoint data for a small number of desired waypoints at different look ahead distances in front of the center of gravity of the vehicle; and generating a steering angle command using a feedforward artificial neural network (ANN) as a function of vehicle speed and the desired waypoint data without modeling vehicle or tire dynamics. The vehicle steering actuator system provides steering control to cause vehicle steering to attempt to achieve the steering angle command.

18 Claims, 5 Drawing Sheets

(56) References Cited

U.S. PATENT DOCUMENTS

| | | | | |
|---|---|---|---|---|
| 2004/0143559 A1* | 7/2004 | Ayala | ............... | G06N 3/086 |
| | | | | 706/13 |
| 2006/0271269 A1* | 11/2006 | Stolle | ............... | G05B 13/027 |
| | | | | 701/106 |
| 2010/0023196 A1* | 1/2010 | Huang | ............... | G05B 13/0285 |
| | | | | 701/31.4 |
| 2010/0305798 A1* | 12/2010 | Phillips | ............... | B60W 50/085 |
| | | | | 701/22 |
| 2012/0072075 A1* | 3/2012 | Choe | ............... | B62D 1/283 |
| | | | | 701/41 |
| 2015/0306761 A1* | 10/2015 | O'Connor | ............... | G06N 3/008 |
| | | | | 700/250 |
| 2016/0349066 A1* | 12/2016 | Chung | ............... | G01C 21/3415 |
| 2018/0120843 A1* | 5/2018 | Berntorp | ............... | G06N 3/08 |
| 2018/0120859 A1* | 5/2018 | Eagelberg | ............... | G05D 1/0088 |
| 2018/0203456 A1* | 7/2018 | Nagasaka | ............... | B60W 30/12 |
| 2018/0247160 A1* | 8/2018 | Rohani | ............... | G06N 3/008 |
| 2018/0251126 A1* | 9/2018 | Linscott | ............... | G05D 1/0088 |
| 2018/0374359 A1* | 12/2018 | Li | ............... | G05D 1/0221 |
| 2019/0009794 A1* | 1/2019 | Toyoda | ............... | B60W 50/10 |
| 2019/0049957 A1* | 2/2019 | Healey | ............... | G01C 21/3484 |
| 2019/0061147 A1* | 2/2019 | Luciw | ............... | B25J 9/163 |
| 2019/0102668 A1* | 4/2019 | Yao | ............... | G05B 17/02 |
| 2019/0113927 A1* | 4/2019 | England | ............... | G05D 1/0231 |
| 2019/0179328 A1* | 6/2019 | Movert | ............... | G06F 16/9537 |
| 2019/0212749 A1* | 7/2019 | Chen | ............... | B62D 15/02 |
| 2019/0217889 A1* | 7/2019 | Szabo | ............... | B62D 1/02 |
| 2019/0220737 A1* | 7/2019 | Yao | ............... | G06N 3/04 |
| 2019/0250622 A1* | 8/2019 | Nister | ............... | G06K 9/00805 |

OTHER PUBLICATIONS

Bojarski et al., "End to End Learning for Self-Driving Cars," Apr. 25, 2016, NVIDIA Corporation (Year: 2016).*

Shiffman, "The Nature of Code: Chapter 10. Neural Networks," Jan. 5, 2016, http://web.archive.org/web/20160105013157/https://natureofcode.com/book/chapter-10-neural-networks/ (Year: 2016).*

Tang et al., "Neural Network versus Behavior Based Approach in Simulated Car Racing Game," 2009, IEEE (Year: 2009).*

Polanco, "Grand Theft Auto V is Being Used to Teach AI Agents How to Drive," Jan. 12, 2017, https://www.geek.com/games/grand-theft-auto-v-is-being-used-to-teach-ai-agents-how-to-drive-1685284/ (Year: 2017).*

* cited by examiner

TRAJECTORY TRACKING FOR VEHICLE LATERAL CONTROL USING NEURAL NETWORK

TECHNICAL FIELD

The present disclosure relates generally to vehicle control systems and more particularly to vehicle lateral control using a neural network.

BACKGROUND

Vehicle motion control systems can use vehicle state information measured or estimated by vehicle sensors and a best available vehicle model to calculate control commands, and more particularly, to calculate a steering angle or torque command for an automatic lateral control system for use with maneuvers such as lane centering, lane changes or parking assist. Vehicle lateral control systems for automated driving may provide steering control using vehicle dynamics model, vehicle sensors, steering actuators, etc. It, however, is difficult to achieve accurate trajectory tracking and control smoothness in an autonomously or semi-autonomously driven vehicle due to complex vehicle and tire dynamics modeling. Moreover, a high-fidelity vehicle model is difficult to obtain for lateral control design at multiple speeds due to factors such as singularity at zero speed or non-linear tire dynamics at different speeds.

Accordingly, it is desirable to provide a system and method for implementing automatic vehicle lateral control. Furthermore, other desirable features and characteristics of the present invention will become apparent from the subsequent detailed description of the invention and the appended claims, taken in conjunction with the accompanying drawings and the background of the invention.

SUMMARY

A processor-implemented method in a vehicle for performing automatic vehicle lateral control using a neural network for trajectory tracking is provided. The method includes receiving a desired vehicle trajectory; constructing, from the desired trajectory, desired waypoint data for a small number of desired waypoints at different look ahead distances in front of the center of gravity of the vehicle; and generating a steering angle command using a feedforward artificial neural network (ANN) as a function of vehicle speed and the desired waypoint data without modeling vehicle or tire dynamics. The vehicle steering actuator system provides steering control to cause vehicle steering to attempt to achieve the steering angle command.

In one embodiment, the ANN has been trained using training data collected while the vehicle or a similar type of vehicle was traveling in a projected travel path of the vehicle.

In one embodiment, the training data includes vehicle position data, vehicle heading data, vehicle speed data, and driver steering angle data.

In one embodiment, the ANN has been trained using training data collected while the vehicle or a similar type of vehicle was manually driven along straight roads, intersections, curvy roads, roundabouts, and while making U-turns.

In one embodiment, the ANN has been trained using back propagation.

In one embodiment, the ANN includes a feedforward neural network with a single hidden layer.

In one embodiment, the ANN includes no more than a single output node.

In one embodiment, the constructed desired waypoint data includes a relative lateral position and heading with respect to a vehicle centered coordinate system for each waypoint.

In one embodiment, constructing desired waypoint data includes calculating a small number of waypoints at different look ahead distances in front of the center of gravity of the vehicle from the desired trajectory wherein the desired trajectory includes a large number of waypoints or a desired polynomial equation.

In one embodiment, the small number of desired waypoints has a value less than ten.

In one embodiment, the ANN can be used for vehicle lateral control with a wider range of vehicle speeds that includes a zero speed.

In one embodiment, the method further includes training the ANN, wherein training the ANN includes: retrieving collected training data, wherein the training data comprises vehicle position data in a GPS coordinate system, vehicle heading data, vehicle speed data, and driver steering angle data; converting collected GPS position data to a vehicle centered coordinate system; determining the number of GPS positions and labeling the data; and computing and correcting the neural network model based on an error metric to determine the final weights of all the nodes in the neural network.

A steering command generation module in an autonomously or semi-autonomously driven vehicle is disclosed. The steering command generation module includes one or more processors configured by programming instructions encoded on non-transient computer readable media. The steering command generation module is configured to: receive a desired vehicle trajectory; construct, from the desired trajectory, desired waypoint data for a small number of desired waypoints at different look ahead distances in front of the center of gravity of the vehicle; and generate a steering angle command using a feedforward artificial neural network (ANN) as a function of vehicle speed and the desired waypoint data without modeling vehicle or tire dynamics.

In one embodiment, the ANN has been trained using training data collected while the vehicle or a similar type of vehicle was traveling in a projected travel path of the vehicle.

In one embodiment, the ANN has been trained using training data collected while the vehicle or a similar type of vehicle was manually driven along straight roads, intersections, curvy roads, roundabouts, and while making U-turns.

In one embodiment, the ANN includes a feedforward neural network with a single hidden layer.

In one embodiment, the ANN includes no more than a single output node.

In one embodiment, the constructed desired waypoint data includes a relative lateral position and heading with respect to a vehicle centered coordinate system for each waypoint.

In one embodiment, the constructed desired waypoint data was constructed by calculating a small number of waypoints at different look ahead distances in front of the center of gravity of the vehicle from the desired trajectory wherein the desired trajectory includes a large number of waypoints or a desired polynomial equation.

A non-transitory computer readable storage medium embodying programming instruction for performing a method in a vehicle is disclosed. The method includes receiving a desired vehicle trajectory; constructing, from the desired trajectory, desired waypoint data for a small number of desired waypoints at different look ahead distances in front of the center of gravity of the vehicle; and generating a steering angle command using a feedforward artificial neural network (ANN) as a function of vehicle speed and the desired waypoint data without modeling vehicle or tire dynamics.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
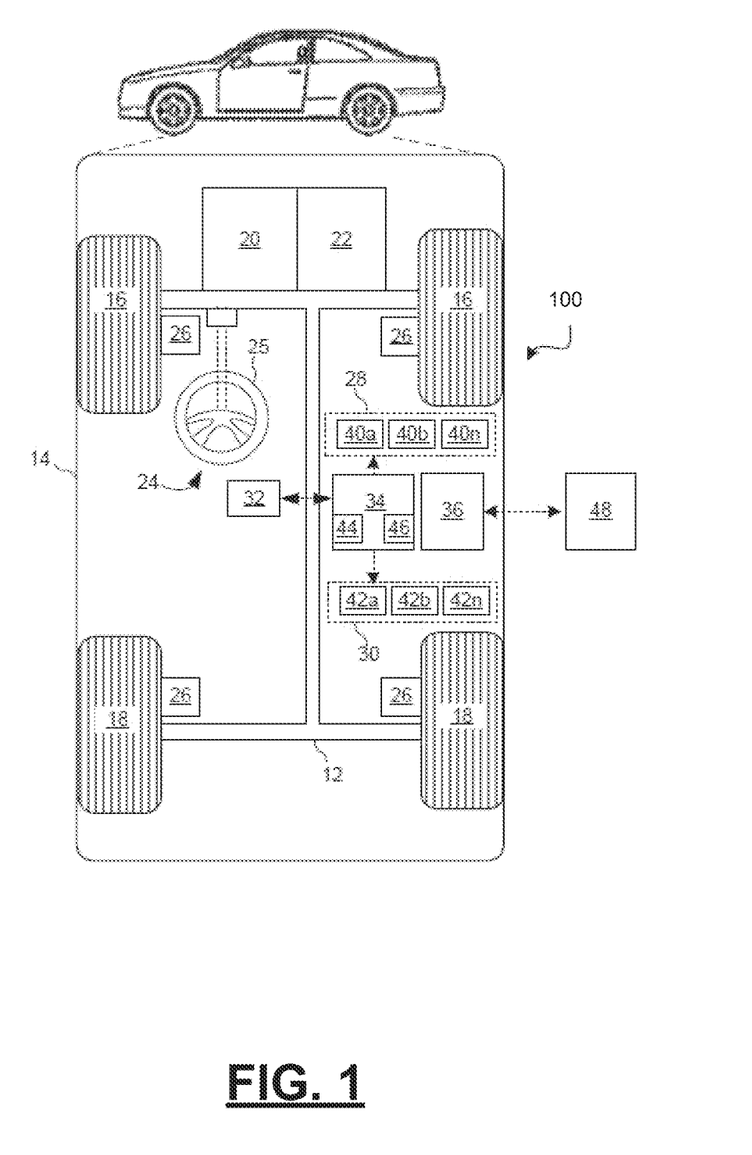
FIG. 1 is a block diagram depicting an example vehicle, in accordance with some embodiments.

FIG. 1 depicts an example vehicle 100. The vehicle 100 generally includes a chassis 12, a body 14, front wheels 16, and rear wheels 18. The body 14 is arranged on the chassis 12 and substantially encloses components of the vehicle 100. The body 14 and the chassis 12 may jointly form a frame. The wheels 16-18 are each rotationally coupled to the chassis 12 near a respective corner of the body 14.

In various embodiments, the vehicle 100 is a vehicle capable of being driven autonomously or semi-autonomously. The vehicle 100 is, for example, a vehicle that can be automatically controlled to carry passengers from one location to another. The vehicle 100 is depicted in the illustrated embodiment as a passenger car, but other vehicle types, including motorcycles, trucks, sport utility vehicles (SUVs), recreational vehicles (RVs), marine vessels, aircraft, etc., may also be used.

As shown, the vehicle 100 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel. The steering system 24 is configured to receive control commands from the controller 34 such as steering angle or torque commands to cause the vehicle 100 to reach desired trajectory waypoints. The steering system 24 can, for example, be an electric power steering (EPS) system, or active front steering (AFS) system.

The sensor system 28 includes one or more sensing devices 40a-40n that sense observable conditions of the exterior environment and/or the interior environment of the vehicle 100 (such as the state of one or more occupants) and generate sensor data relating thereto. Sensing devices 40a-40n might include, but are not limited to, radars (e.g., long-range, medium-range-short range), lidars, global positioning systems (GPS), optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The GPS sensors in sensing devices 40a-40n of sensor system 28 may be used for recording the vehicle position in a GPS coordinate system. In particular, as described below, a training data set that is collected for training an artificial neural network in the vehicle that is used by vehicle control to calculate a target steering angle may be recorded using GPS data from the GPS sensors. The training data set may include vehicle position data in a GPS coordinate system.

The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 100. In various embodiments, the data storage device 32 stores defined maps of the navigable environment. In various embodiments, the defined maps may be predefined by and obtained from a remote system. For example, the defined maps may be assembled by the remote system and communicated to the vehicle 100 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 100. In various embodiments, controller 34 is configured to implement a mapping system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 100, and generate control signals that are transmitted to the actuator system 30 to automatically control the components of the vehicle 100 based on the logic, calculations, methods, and/or algorithms. Although only one controller 34 is shown in FIG. 1, embodiments of the vehicle 100 may include any number of controllers 34 that communicate over any suitable communication medium or a combination of communication mediums and that cooperate to process the sensor signals, perform logic, calculations, methods, and/or algorithms, and generate control signals to automatically control features of the vehicle 100.

Figure 2:
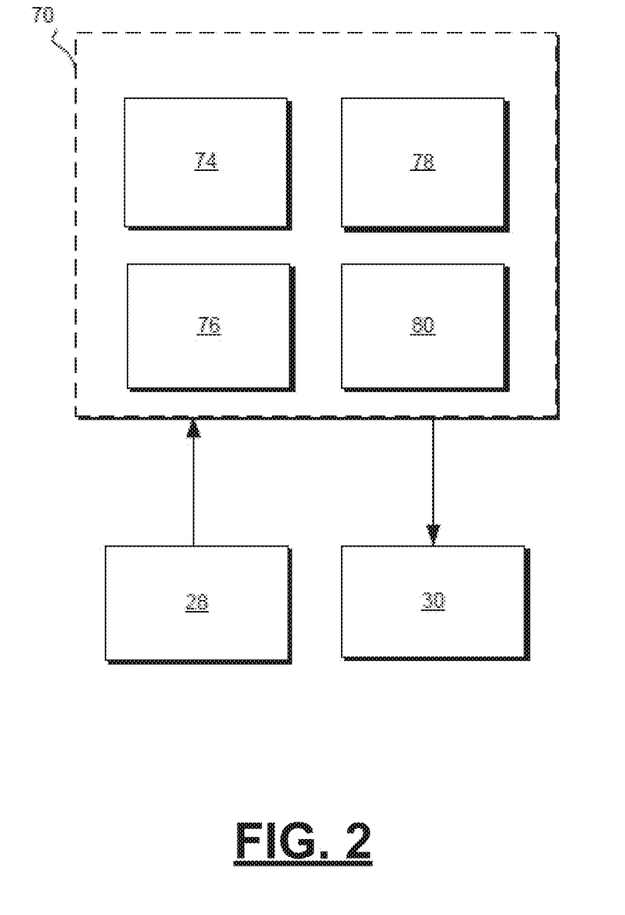
FIG. 2 is a block diagram depicting an example autonomous or semi-autonomous driving system, in accordance with some embodiments.

In accordance with various embodiments, controller 34 implements an autonomous or semi-autonomous driving system 70 as shown in FIG. 2. That is, suitable software and/or hardware components of controller 34 (e.g., processor 44 and computer-readable storage device 46) are utilized to provide an autonomous or semi-autonomous driving system 70.

In various embodiments, the instructions of the autonomous or semi-autonomous driving system 70 may be organized by function or system. For example, as shown in FIG. 2, the autonomous or semi-autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 100. In various embodiments, the perception system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 100 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 100 to follow. The vehicle control system 80 generates control signals for controlling the vehicle 100 according to the determined path.

In various embodiments, the controller 34 implements machine learning techniques to assist the functionality of the controller 34.

Figure 3:
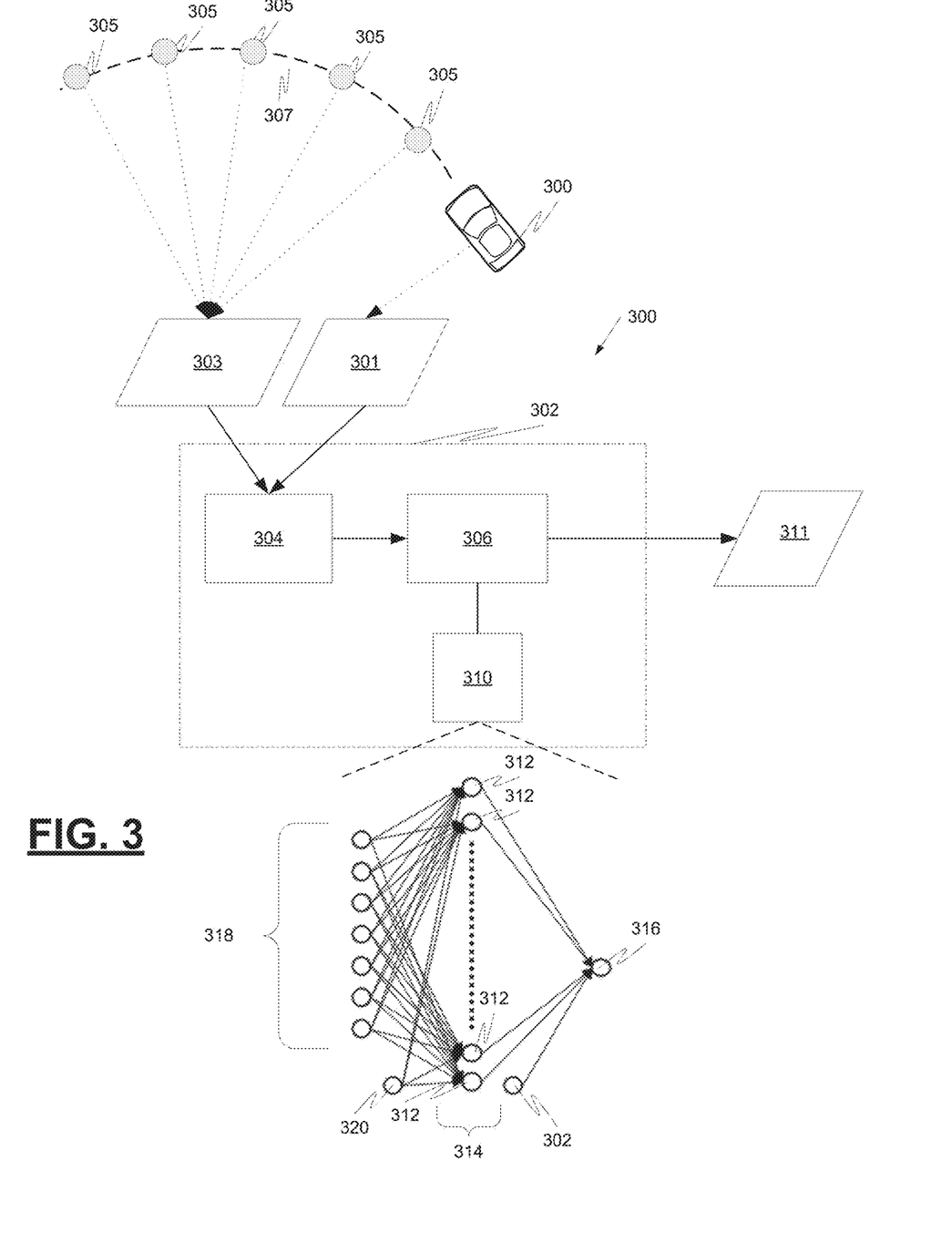
FIG. 3 is a block diagram depicting an example steering command generation module in an example vehicle, in accordance with some embodiments.

FIG. 3 is a block diagram depicting an example a steering command generation module 302 in a lateral control system in an example vehicle 300. The vehicle 300 may be an autonomously driven vehicle or a semi-autonomously driven vehicle. The example steering command generation module 302 comprises one or more processors configured by programming instructions encoded on non-transient computer readable media. The example steering command generation module 302 is configured to calculate steering angles for the vehicle 300 given different waypoints 305 along a planned travel path 307 and is also configured to generate steering commands 311 at those waypoints. The example steering command generation module 302 may be used within a vehicle control system 80 for providing vehicle lateral control.

The example steering command generation module 302 comprises an input nodes data generation module 304 and a target steering angle generator module 306. The example input nodes data generation module 304 and target steering angle generator module 306 are implemented, in this example, via the one or more processors configured by programming instructions.

The example input nodes data generation module 304 is configured to receive vehicle state data 301, such as vehicle speed, and desired waypoints data 303 for a plurality of waypoints 305 in a projected travel path 307 of the vehicle 300 as inputs. The waypoint data may comprise a lateral position and heading with respect to the vehicle centered coordinate system for each waypoint 305.

The example input nodes data generation module 304 is further configured to construct a small number of waypoints with different look ahead distances in front of the center of gravity of the vehicle. The generated desired trajectory of vehicle 300 at any time stamp may include a large number of waypoints or a desired polynomial equation. Constructing a small number of waypoints includes calculating the desired waypoints from the received desired trajectory with different look ahead distances, such as 3 meters, 4 meters, 5 meters, 6 meters, 7 meters, and 8 meters in front of the center of gravity of the vehicle along the desired trajectory. Each desired waypoint comprises a relative lateral position $\Delta y$ and a relative heading angle $\Delta\phi$ with respect to a vehicle centered coordinate system. In the example, five waypoints 305 are shown but fewer or more waypoints may be used with the example steering command generation module 302. In some examples, fewer than 10 waypoints may be used. The relative lateral position and relative heading angle of each desired waypoint are further normalized to $[-1, 1]$ as inputs to the ANN 310 module. In addition, the vehicle speed information from the vehicle state data 301 is further normalized to $[0, 1]$ range using max-min normalization method as the input to the ANN 310 module.

The example steering angle generator module 306 is configured to calculate target steering angles using the vehicle state data and the desired waypoint data and generate steering commands 311 configured to direct a steering actuator in the vehicle 300 to cause the steering system in the vehicle to attempt to achieve the calculated target steering angles. The example steering angle generator module 306 comprises a feedforward artificial neural network (ANN) 310 with a single hidden layer.

The example ANN 310 is configured to calculate target steering angles and generate steering commands without modeling vehicle or tire dynamics. The example ANN 310 comprises less than 50 nodes 312 in hidden layers 314. The example ANN 310 comprises no more than a single hidden layer 314. In one example, the ANN 310 comprises 19 hidden layer nodes 312 in a single hidden layer 314.

The example ANN 310 comprises no more than a single output node 316. The input nodes 318 of the example ANN 310 comprise one node each for receiving the vehicle speed and the relative lateral position and heading with respect to vehicle centered coordinate system at each waypoint. In the illustrated example, the ANN 310 includes 7 input nodes 318 and one input bias node 320. Five of the seven input nodes are constructed desired waypoints with a look-ahead distance of 3 meters, 5 meters, 7 meters, 9 meters, 11 meters ahead of the vehicle along the desired trajectory respectively. The distance is the Euclidean distance between the desired waypoint and the vehicle center of gravity. The relative lateral position of each of the 5 waypoints is used with normalization range $[-1, 1]$ as input to the hidden layer 314. The relative heading angle of the waypoint with a look-ahead distance of 3 meters is used as another input with normalization range $[-1, 1]$ to the hidden layer 314. The vehicle speed value with normalization range $[0, 1]$ is another input to the hidden layer 314. In the illustrated example, the ANN 310 includes 1 output node 316 and a bias node 302 coupled to the output node 316 along with the nodes 312 in the hidden layer 314. The example ANN 310 is trained using mean square error performance function. The backpropagation method is further applied to train the ANN model. Many choices of activation function may be chosen. In the illustrated example, the nonlinear sigmod activation function $$f(z) = \frac{1}{(1 + e^{-z})}$$

is used for the hidden layer node, and the linear activation function is used for the output layer node.

The ANN 310 is trained before use by the example steering command generator module 302 to compute target steering angles and generate steering commands. The example ANN is trained using back propagation. In one example, the ANN 310 can be trained using driving data collected while the vehicle 300 or another vehicle of the same type was manually driven. The driving data used for training the ANN 310 may comprise vehicle position data (e.g., using GPS coordinates), vehicle speed, vehicle heading, and the driver steering angle value along straight roads, curvy roads, and roundabouts, traversed by the vehicle 300 and while making U-turns. The driving data used for training the ANN 310 may additionally or alternatively comprise vehicle position data (e.g., using GPS coordinates), vehicle speed, vehicle heading, and the driver steering angle value along a travel path to be later traversed by the vehicle 300. In some embodiments, vehicle acceleration values and roadway curvature values along a travel path on which the vehicle 300 is driven may also be used.

In another example, the ANN 310 may be trained using simulation data collected during a computer-simulated driving of the vehicle 300 or another vehicle of the same type along a projected travel path. The simulation data used for training the ANN 310 may comprise vehicle position data (e.g., using GPS coordinates), vehicle speed, vehicle heading, and the driver steering angle value for a plurality of points along a projected travel path.

Figure 4A:
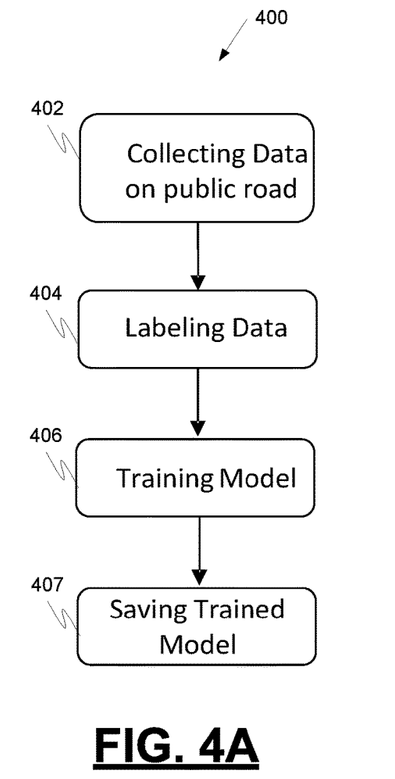
FIG. 4A is a process flow chart depicting an example process for training an artificial neural network for use in generating a steering command to control a steering actuator when exercising lateral control in a vehicle, in accordance with some embodiments.
Figure 4B:
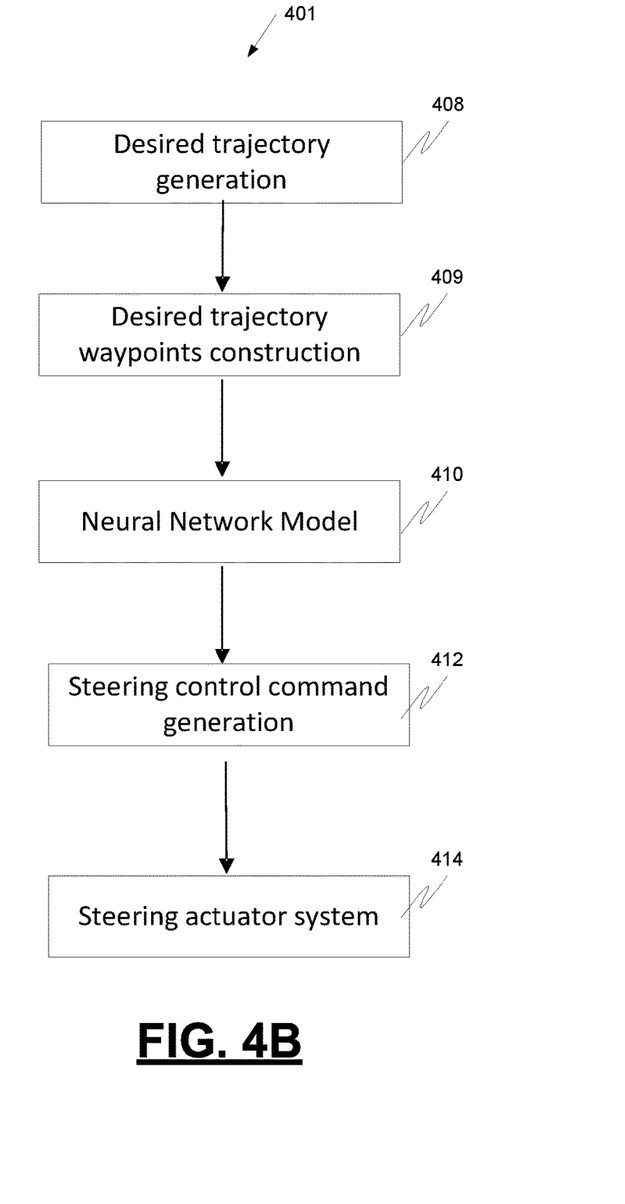
FIG. 4B is a process flow chart depicting an example process for generating a steering command to control a steering actuator when exercising lateral control in a vehicle, in accordance with some embodiments.

FIG. 4A is a process flow chart depicting an example process 400 for training an artificial neural network (ANN) for use in generating a steering command to control a steering actuator when exercising lateral control in a vehicle. FIG. 4B is a process flow chart depicting an example process 401 for generating a steering command using a trained ANN to control a steering actuator when exercising lateral control in a vehicle.

The example process 400 includes training an ANN model prior to use. Training the ANN model comprises collecting training data for the ANN model (operation 402). In one example, collecting training data includes collecting training data while the vehicle in which the ANN is located (or another vehicle of the same type) is manually driven. The training data used for training the ANN model may comprise vehicle position data (e.g., using GPS coordinates), vehicle speed, vehicle heading, and the driver steering angle value for a plurality of points along a straight roads, curvy roads, and roundabouts, traversed by the vehicle and while making U-turns. In one example, the vehicle speed collected in the training data while the vehicle is driven on the road varies from zero meters per second, such as when the vehicle is stopped in front of a stop sign, to a high speed, such as 25 meters per second while the vehicle is driven on a highway. The training data used for training the ANN model may additionally or alternatively comprise vehicle position data (e.g., using GPS coordinates), vehicle speed, vehicle heading, and the driver steering angle value for a plurality of points along a travel path to be later traversed by the vehicle. In another example, training data for training the ANN model may comprise comprises simulation data collected during computer-simulated driving of the vehicle (or another vehicle of the same type) along a projected travel path. The simulation data used for training the ANN model may comprise vehicle position data (e.g., using GPS coordinates), vehicle speed, vehicle heading, and the driver steering angle value for a plurality of points along an anticipated future travel path or simulated data for a plurality of points along a straight road, a curvy road, and a roundabout. The training data is labelled for both inputs and targets (operation 404) and subsequently used to train the ANN model (operation 406). The ANN model may be trained using a mean square error performance metric. A backpropagation method may be further applied to train the ANN model. After the ANN model has been trained, the model will be saved (operation 407) and further applied to the module 410 to calculate the steering angle control command in real time.

The vehicle position data in the collected training data includes latitude and longitude in a global geographic coordinate system. At any time stamp, a number of GPS positions and vehicle heading values with different distances in front of the center of the gravity of the vehicle are converted to a current vehicle centered coordinate system to generate relative lateral position and relative heading data. This data together with the current speed value at the same time stamp are specified as inputs for subsequently training the ANN. The driver steering wheel angle value at the same time stamp is specified as a target for subsequently training the ANN.

The example process 401 includes using the trained ANN to calculate a target steering angle and generate steering commands. A desired trajectory is generated (operation 408). A plurality of waypoints for input to the trained ANN are constructed (operation 409). The number of waypoints are constructed from the desired trajectory generated in operation 408 at different look ahead distances in front of the center of gravity of the vehicle. The number of waypoints selected for use may be fewer than 10 waypoints. In one example, 5 waypoints were selected for use. The waypoint data comprises relative lateral position data and relative heading angle data with respect to a vehicle centered coordinate system for each waypoint.

The waypoint data for the plurality of selected waypoints is provided as an input to the trained ANN. The ANN executes using the waypoint data for the plurality of selected waypoints (operation 410). A steering angle is calculated and a steering control command to achieve vehicle lateral control using the calculated steering angle is generated and output from the trained ANN (operation 412). The generated steering command may be provided to a steering actuator system in the vehicle (operation 414).

Figure 5:
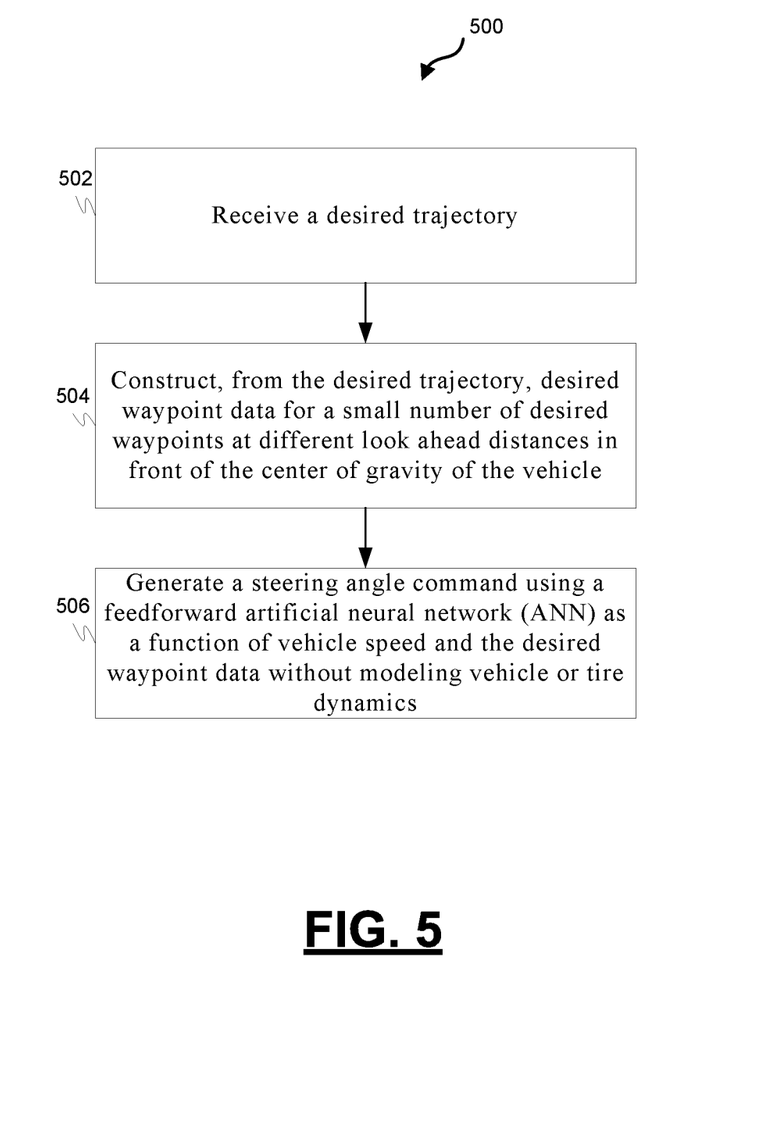
FIG. 5 is a process flow chart depicting an example process for performing automatic vehicle lateral control using a neural network for trajectory tracking, in accordance with some embodiments.

FIG. 5 is a process flow chart depicting an example process 500 for performing automatic vehicle lateral control using a neural network for trajectory tracking. The example process includes receiving a desired trajectory (operation 502).

The example process further includes constructing, from the desired trajectory, a small number of desired waypoints at different look ahead distances in front of the center of gravity of the vehicle. (operation 504). Constructing a small number of waypoints at different look ahead distances may be performed in a manner described above with regard to FIGS. 3 and 4B.

The example process also includes generating a steering angle command using a feedforward artificial neural network (ANN) as a function of the constructed desired waypoint data and vehicle speed without modeling vehicle or tire dynamics (operation 506). Generating a steering angle command using a feedforward ANN may be performed in a manner described above with regard to FIGS. 3 and 4B.

The example process may be used as part of the vehicle control operations in an autonomous or semi-autonomous vehicle control pipeline.

The described systems, methods, apparatus, and techniques may allow vehicle control in an autonomously or semi-autonomously driven vehicle to control the vehicle smoothly. The described systems, methods, apparatus, and techniques may be used for a wider range of vehicle speeds, including low speeds down to zero, because there is not a need to consider complex kinematics or dynamics of the vehicle at different speeds. The described systems, methods, apparatus, and techniques may be compatible with common autonomous or semi-autonomous vehicle control design by using trajectory waypoints from path planning, rather than raw sensor outputs, such as camera images. The described systems, methods, apparatus, and techniques may require less computational power compared to other optimal control based approaches.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A processor-implemented method in a real world vehicle for performing automatic vehicle lateral control using a neural network for trajectory tracking, the method comprising:
   receiving a desired trajectory for the real world vehicle;
   constructing, from the desired trajectory, desired waypoint data for less than ten desired waypoints at different look ahead distances in front of the center of gravity of the real world vehicle, wherein the constructed desired waypoint data comprises a relative lateral position and heading with respect to a vehicle centered coordinate system for each waypoint; and
   generating a steering angle command for a steering system in the real world vehicle from a feedforward artificial neural network (ANN) that has no more than one hidden layer, the ANN having been trained using real world training data collected while the real world vehicle or a similar type of vehicle was traveling in a projected travel path of the real world vehicle by:
   collecting real world training data comprising real world vehicle position data in a GPS coordinate system, real world vehicle heading data, real world vehicle speed data, and real world driver steering angle data, wherein the real world training data was collected while the real world vehicle or a similar type of vehicle was manually driven along straight roads, intersections, curvy roads, roundabouts, and while making U-turns;
converting the collected GPS position data to a vehicle centered coordinate system;
labeling the real world training data; and
computing and correcting the ANN model based on an error metric to determine a final weight for each node in the ANN;
wherein vehicle speed and the desired waypoint data for less than ten waypoints are input to the ANN, the steering angle command is output from the ANN, the ANN does not model vehicle dynamics, and the ANN does not model tire dynamics.

2. The method of claim 1, wherein the ANN can be used for vehicle lateral control with a range of vehicle speeds that includes a zero speed.

3. The method of claim 1, wherein the constructing desired waypoint data includes calculating less than ten waypoints at different look ahead distances in front of the center of gravity of the vehicle from the desired trajectory wherein the desired trajectory comprises more than ten waypoints or a desired polynomial equation.

4. The method of claim 3, wherein the constructing desired waypoint data includes calculating less than six waypoints.

5. The method of claim 1, wherein the ANN has been trained using back propagation.

6. The method of claim 1, wherein the ANN comprises no more than a single output node.

7. A non-transitory computer readable storage medium embodying programming instruction for performing a method in a real world vehicle, the method comprising:
receiving a desired trajectory for the real world vehicle;
constructing, from the desired trajectory, desired waypoint data for less than ten desired waypoints at different look ahead distances in front of the center of gravity of the real world vehicle, wherein the constructed desired waypoint data comprises a relative lateral position and heading with respect to a vehicle centered coordinate system for each waypoint; and
generating a steering angle command for a steering system in the real world vehicle from a feedforward artificial neural network (ANN) that has no more than one hidden layer, the ANN having been trained using real world training data collected while the real world vehicle or a similar type of vehicle was traveling in a projected travel path of the real world vehicle by:
collecting real world training data comprising real world vehicle position data in a GPS coordinate system, real world vehicle heading data, real world vehicle speed data, and real world driver steering angle data, wherein the real world training data was collected while the real world vehicle or a similar type of vehicle was manually driven along straight roads, intersections, curvy roads, roundabouts, and while making U-turns;
converting the collected GPS position data to a vehicle centered coordinate system;
labeling the real world training data; and
computing and correcting the ANN model based on an error metric to determine a final weight for each node in the ANN;
wherein vehicle speed and the desired waypoint data for less than ten waypoints are input to the ANN, the steering angle command is output from the ANN, the ANN does not model vehicle dynamics, and the ANN does not model tire dynamics.

8. The non-transitory computer readable storage medium claim 7, wherein the ANN has been trained using back propagation.

9. The non-transitory computer readable storage medium claim 7, wherein the ANN comprises no more than a single output node.

10. The non-transitory computer readable storage medium claim 7, wherein the constructing desired waypoint data includes calculating less than ten waypoints at different look ahead distances in front of the center of gravity of the vehicle from the desired trajectory wherein the desired trajectory comprises more than ten waypoints or a desired polynomial equation.

11. The non-transitory computer readable storage medium claim 7, wherein the constructing desired waypoint data includes calculating less than six waypoints.

12. The non-transitory computer readable storage medium claim 7, wherein the ANN can be used for vehicle lateral control with a range of vehicle speeds that includes a zero speed.

13. A steering command generation module in an autonomously or semi-autonomously driven real world vehicle, the steering command generation module comprising one or more processors configured by programming instructions encoded on non-transient computer readable media, the steering command generation module configured to:
receive a desired trajectory for the real world vehicle;
construct, from the desired trajectory, desired waypoint data for less than ten desired waypoints at different look ahead distances in front of the center of gravity of the real world vehicle, wherein the constructed desired waypoint data comprises a relative lateral position and heading with respect to a vehicle centered coordinate system for each waypoint; and
generate a steering angle command for a steering system in the real world vehicle from a feedforward artificial neural network (ANN) that has no more than one hidden layer, the ANN having been trained using real world training data collected while the real world vehicle or a similar type of vehicle was traveling in a projected travel path of the real world vehicle by:
collecting real world training data comprising real world vehicle position data in a GPS coordinate system, real world vehicle heading data, real world vehicle speed data, and real world driver steering angle data, wherein the real world training data was collected while the real world vehicle or a similar type of vehicle was manually driven along straight roads, intersections, curvy roads, roundabouts, and while making U-turns;
converting the collected GPS position data to a vehicle centered coordinate system;
labeling the real world training data; and
computing and correcting the ANN model based on an error metric to determine a final weight for each node in the ANN;
wherein vehicle speed and the desired waypoint data for less than ten waypoints are input to the ANN, the steering angle command is output from the ANN, the ANN does not model vehicle dynamics, and the ANN does not model tire dynamics.

14. The steering command generation module of claim 13, wherein the ANN can be used for vehicle lateral control with a range of vehicle speeds that includes a zero speed.

15. The steering command generation module of claim 13, wherein the ANN has been trained using back propagation.

16. The steering command generation module of claim 13, wherein vehicle speed and the desired waypoint data for less than six waypoints are input to the ANN.

17. The steering command generation module of claim 13, wherein the ANN comprises no more than a single output node.

18. The steering command generation module of claim 13, wherein constructing desired waypoint data includes calculating less than ten waypoints at different look ahead distances in front of the center of gravity of the vehicle from the desired trajectory wherein the desired trajectory comprises more than ten waypoints or a desired polynomial equation.

* * * * *